United States Patent
Hashida (10) Patent No.: US 9,088,465 B2
(45) Date of Patent: Jul. 21, 2015

(54) RECEIVER CIRCUIT

(71) Applicant: FUJITSU LIMITED, Kawasaki-shi, Kanagawa (JP)

(72) Inventor: Takushi Hashida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/277,257

(22) Filed: May 14, 2014

(65) Prior Publication Data

US 2015/0030106 A1    Jan. 29, 2015

(30) Foreign Application Priority Data

Jul. 29, 2013    (JP) ................. 2013-156804

(51) Int. Cl.
*H03D 3/24*    (2006.01)
*H04L 27/00*    (2006.01)
*H04L 27/22*    (2006.01)

(52) U.S. Cl.
CPC ..................................... *H04L 27/22* (2013.01)

(58) Field of Classification Search
CPC ..... H04L 27/22; H04L 27/2332; H04L 7/033; H04L 7/087
USPC ................. 375/329, 371, 375, 376; 327/156; 455/307, 325, 127
See application file for complete search history.

(56) References Cited

U.S. PATENT DOCUMENTS

2010/0329403 A1    12/2010  Beukema et al.
2012/0119801 A1*    5/2012  Hsieh et al. .................... 327/156
2014/0010337 A1*    1/2014  Staszewski et al. ........... 375/376

FOREIGN PATENT DOCUMENTS

JP    2011-10296    1/2011

* cited by examiner

*Primary Examiner* — Khai Tran
(74) *Attorney, Agent, or Firm* — Fujitsu Patent Center (57) ABSTRACT

A receiver circuit includes: first and second phase adjusters that generate first and second clock signals; first and second determinators that perform binary determination on input data in synchronization with the first and second clock signals; a phase detection circuit that detects a phase on the basis of determination values of the first and the second determinators; a filter that performs filtering on the detected phase and thereby outputs first phase information to the second phase adjuster; an adder that adds a shift amount to the first phase information and thereby outputs second phase information to the first phase adjuster; and a corrector that outputs third phase information for decreasing variation in phase difference of the first clock signal with respect to the second clock signal to the first phase adjuster.

7 Claims, 11 Drawing Sheets

| Do[n] | Bd[n] | Do[n+1] | UP | DN |
|---|---|---|---|---|
| 0 | 0 | 0 | 0 | 0 |
| 0 | 0 | 1 | 0 | 1 |
| 0 | 1 | 0 | 1 | 1 |
| 0 | 1 | 1 | 1 | 0 |
| 1 | 0 | 0 | 1 | 0 |
| 1 | 0 | 1 | 1 | 1 |
| 1 | 1 | 0 | 0 | 1 |
| 1 | 1 | 1 | 0 | 0 |

RECEIVER CIRCUIT

CROSS-REFERENCE TO RELATED APPLICATION

This application is based upon and claims the benefit of priority of the prior Japanese Patent Application No. 2013-156804, filed on Jul. 29, 2013, the entire contents of which are incorporated herein by reference.

FIELD

The embodiments discussed herein are directed to a receiver circuit.

BACKGROUND

With improvement in performance of information processors such as apparatuses and servers intended for communication trunk, the data rate of signal transmitting/receiving inside and outside the apparatus needs to be increased. The receiver circuit performs reproduction (CDR: Clock and Data Recovery) of the clock and data from data of a high data rate in order to absorb the difference in clock frequency with respect to the transmitter circuit. As a CDR method in a transmitter/receiver circuit at such a high speed as exceeding 10 Gbps, there is known CDR in a two-times over sampling method of performing sampling two times in 1 unit interval (UI) section of data and setting one sampling to the center of data and the other sampling to the transition point of data.

Further, a closed loop clock correction method is known which includes a step of adjusting two or more input signals including at least one in-phase clock and at least one quadrature phase clock, and a step of applying the adjusted quadrature phase clock signal to a device capable of generating a 4-quadrant interpolated output clock phase (refer to, for example, Patent Document 1). First, an interpolated output clock phase is delayed so as to form a clock for measurement device, and two or more adjusted input signals to the measurement device are measured over a range of the interpolated output clock phase. Then, an error between the in-phase clock and the quadrature phase clock is decided using sample information from the measurement device, and the in-phase clock and the quadrature phase clock are adopted using the decided error information in a closed loop feedback configuration.

[Patent Document 1] Japanese Laid-open Patent Publication No. 2011-10296

The receiver circuit can sample a center and a transition point of data using a first clock signal and a second clock signal. If the phase difference between the first clock signal and the second clock signal is constant, the center of data can be sampled at all times. However, if the receiver circuit has a function of shifting the phase of the first clock signal, there occurs variation in the phase difference between the first clock signal and the second clock signal. In this case, it is impossible to sample the center of data to cause a problem of increasing the occurrence rate of data error.

SUMMARY

A receiver circuit includes: a first phase adjuster that generates a first clock signal; a second phase adjuster that generates a second clock signal; a first determinator that performs binary determination on input data in synchronization with the first clock signal; a second determinator that performs binary determination on the input data in synchronization with the second clock signal; a phase detection circuit that detects a phase on the basis of determination values of the first determinator and the second determinator; a filter that performs filtering on the phase detected by the phase detection circuit and thereby outputs first phase information; an adder that adds a shift amount to the first phase information and thereby outputs second phase information; and a corrector that generates third phase information for decreasing variation in phase difference of the first clock signal with respect to the second clock signal, wherein the first phase adjuster adjusts a phase of the first clock signal on the basis of the second phase information and the third phase information, and wherein the second phase adjuster adjusts a phase of the second clock signal on the basis of the first phase information.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
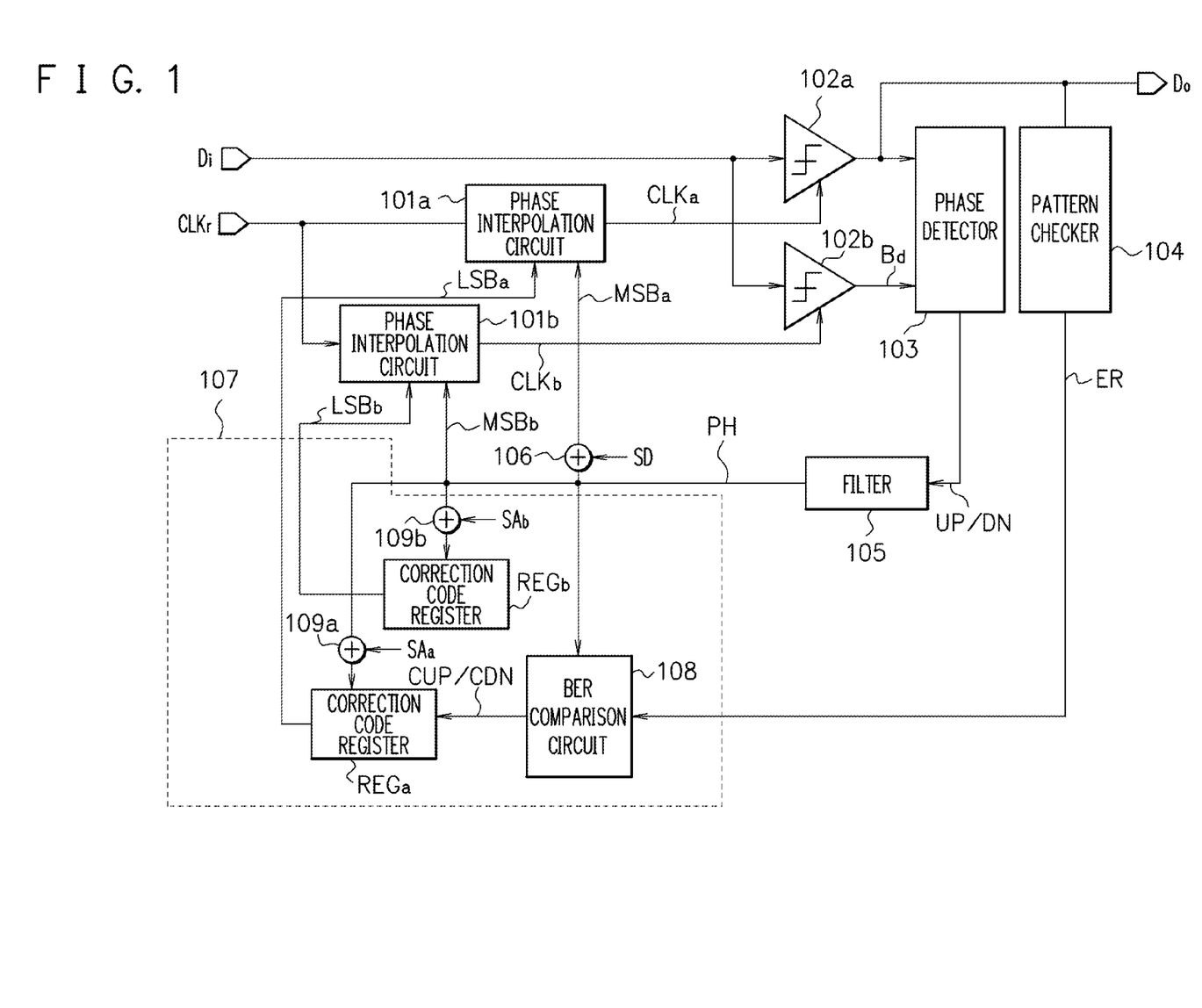
FIG. 1 is a diagram illustrating a configuration example of a receiver circuit according to an embodiment.

FIG. 1 is a diagram illustrating a configuration example of a receiver circuit according to this embodiment. The receiver circuit receives, from a transmitter circuit, data Di with a high bit rate in an integrated circuit chip, between chips (in a device, between devices). A clock signal of the receiver circuit is asynchronous with a clock signal of the transmitter circuit.

A first phase interpolation circuit 101a generates a first clock signal CLKa using a reference clock signal CLKr. A second phase interpolation circuit 101b generates a second clock signal CLKb using the reference clock signal CLKr. The first phase interpolation circuit 101a is a first phase adjuster and adjusts the phase of the first clock signal CLKa on the basis of phase information MSBa and LSBa. The phase information MSBa is high-order bit phase information, and the phase information LSBa is low-order bit phase information. The second phase interpolation circuit 101b is a second phase adjuster and adjusts the phase of the second clock signal CLKb on the basis of phase information MSBb and LSBb. The phase information MSBb is high-order bit phase information, and the phase information LSBb is low-order bit phase information. When a shift amount SD is "0," the phase difference between the first clock signal CLKa and the second clock signal CLKb is 90 degrees.

Figure 2A:
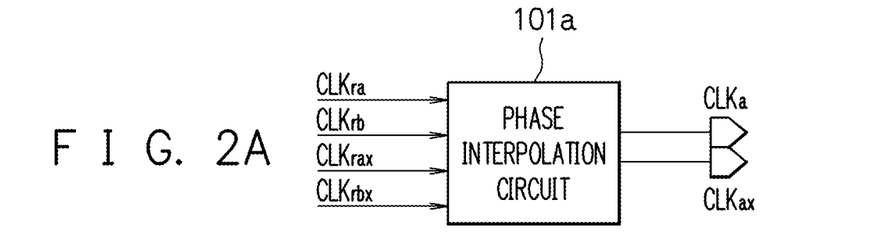
FIGS. 2A and 2B are diagrams illustrating examples of input and output signals of a first phase interpolation circuit and a second phase interpolation circuit.

FIG. 2A is a diagram illustrating examples of input and output signals of the first phase interpolation circuit 101*a*. The first phase interpolation circuit 101*a* receives input of four-phase reference clock signals CLKra, CLKrb, CLKrax, CLKrbx, and outputs first clock signals CLKa and CLKax by performing phase interpolation on the four-phase reference clock signals CLKra, CLKrb, CLKrax, CLKrbx. The four-phase reference clock signals CLKra, CLKrb, CLKrax, CLKrbx are shifted in phase by 90 degrees each. The reference clock signal CLKra is a signal with a phase of 0 degrees, the reference clock signal CLKrb is a signal with a phase of 90 degrees, the reference clock signal CLKrax is a signal with a phase of 180 degrees, and the reference clock signal CLKrbx is a signal with a phase of 270 degrees. The first clock signals CLKa and CLKax are differential signals inverted in phase to each other.

Figure 3:
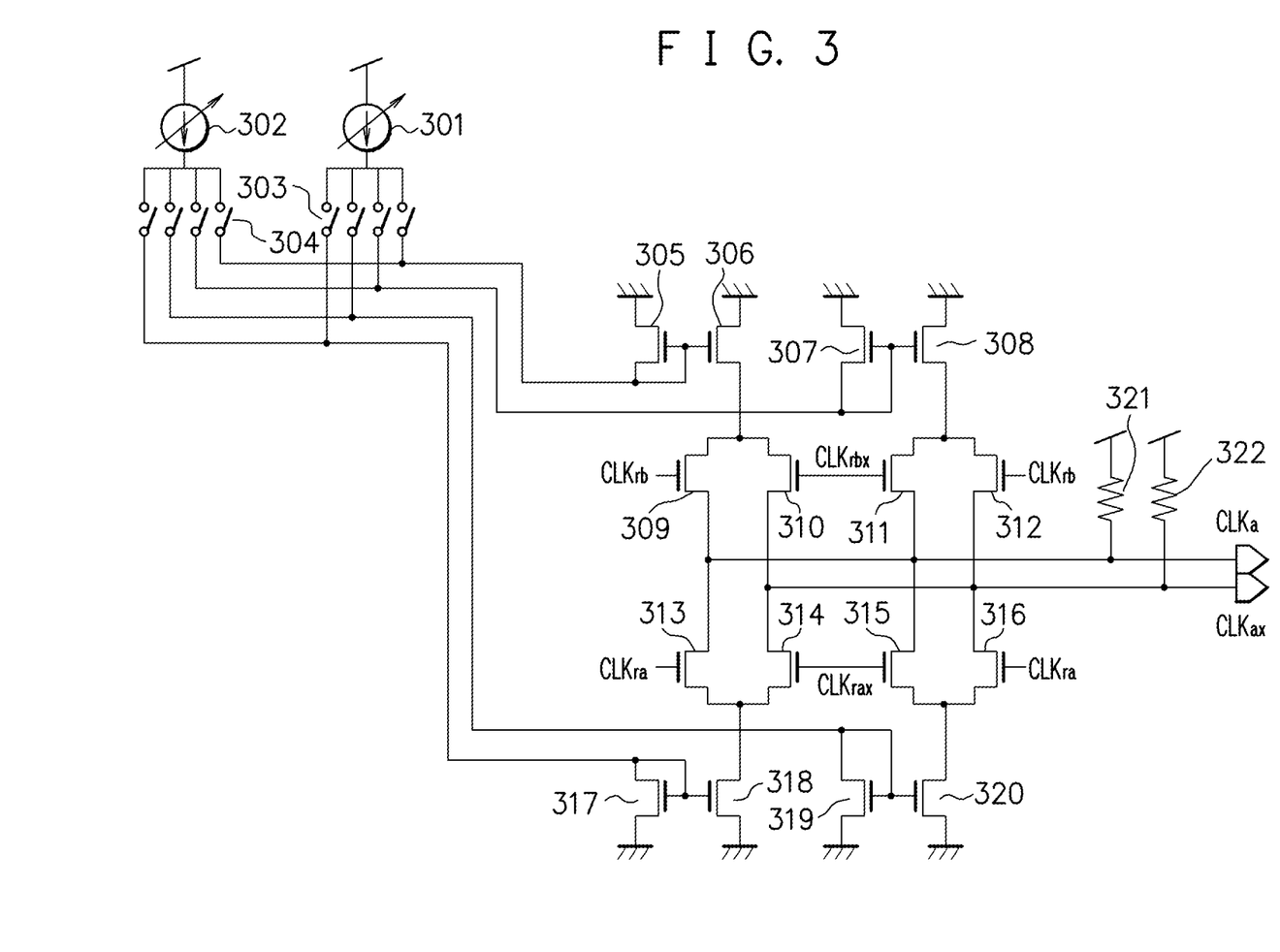
FIG. 3 is a diagram illustrating a configuration example of the first phase interpolation circuit.

FIG. 3 is a diagram illustrating a configuration example of the first phase interpolation circuit 101*a*. A current source 301 is connected between a power source potential node and a switch group 303. A current source 302 is connected between the power source potential node and a switch group 304. The current sources 301 and 302 supply currents different in magnitude from each other. The switch group 303 has four switches which connect the current source 301 to a gate of a transistor 305, a gate of a transistor 307, a gate of a transistor 319, and a gate of a transistor 317 respectively. The switch group 304 has four switches which connect the current source 302 to the gate of the transistor 305, the gate of the transistor 307, the gate of the transistor 319, and the gate of the transistor 317 respectively. The switch groups 303 and 304 are controlled according to the phase information MSBa and LSBa. The total current value of the variable current sources 301 and 302 are constant (for example, I₀×256), and the current is allocated to the variable current sources 301 and 302 according to the phase information MSBa and LSBa. For example, when generating the clock signal CLKa to be interpolated between the clock signals CLKra and CLKrb at 1:3, the variable current source 301 is set to $I_0 \times 64$ and the variable current source 302 is set to $I_0 \times 192$.

An n-channel field effect transistor 305 has a source connected to a ground potential node, and the gate and a drain which are connected to a gate of a transistor 306. The n-channel field effect transistor 306 has a source connected to the ground potential node, the gate connected to the gate of the transistor 305, and a drain connected to gates of transistors 309 and 310. The n-channel field effect transistor 307 has a source connected to the ground potential node, and the gate and a drain which are connected to a gate of a transistor 308. The n-channel field effect transistor 308 has a source connected to the ground potential node, the gate connected to the gate of the transistor 307, and a drain connected to sources of transistors 311 and 312.

The n-channel field effect transistor 309 has the source connected to the drain of the transistor 306, a gate connected to the node of the reference clock signal CLKrb, and a drain connected to the node of the first clock signal CLKa. The n-channel field effect transistor 310 has the source connected to the drain of the transistor 306, the gate connected to the reference clock signal CLKrbx, and a drain connected to the node of the first clock signal CLKax. The n-channel field effect transistor 311 has the source connected to the drain of the transistor 308, a gate connected to the node of the reference clock signal CLKrbx, and a drain connected to the node of the first clock signal CLKa. The n-channel field effect transistor 312 has the source connected to the drain of the transistor 308, a gate connected to the node of the reference clock signal CLKrb, and a drain connected to the node of the first clock signal CLKax.

The n-channel field effect transistor 317 has a source connected to the ground potential node, the gate and a drain which are connected to a gate of the transistor 318. The n-channel field effect transistor 318 has a source connected to the ground potential node, the gate connected to the gate of the transistor 317, and a drain connected to sources of transistors 313 and 314. The n-channel field effect transistor 319 has a source connected to the ground potential node, the gate and a drain which are connected to a gate of a transistor 320. The n-channel field effect transistor 320 has a source connected to the ground potential node, the gate connected to the gate of the transistor 319, and a drain connected to sources of transistors 315 and 316.

The n-channel field effect transistor 313 has the source connected to the drain of the transistor 318, a gate connected to the node of the reference clock signal CLKra, and a drain connected to the node of the first reference clock signal CLKa. The n-channel field effect transistor 314 has the source connected to the drain of the transistor 318, a gate connected to the node of the reference clock signal CLKrax, and a drain connected to the node of the first reference clock signal CLKax. The n-channel field effect transistor 315 has the source connected to the drain of the transistor 320, a gate connected to the node of the reference clock signal CLKrax, and a drain connected to the node of the first reference clock signal CLKa. The n-channel field effect transistor 316 has the source connected to the drain of the transistor 320, a gate connected to the node of the reference clock signal CLKra, and a drain connected to the node of the first reference clock signal CLKax. A resistor 321 is connected between the power source potential node and the node of the first clock signal CLKa. A resistor 322 is connected between the power source potential node and the node of the first clock signal CLKax.

The first clock signals CLKa and CLKax are generated by weighing each of the four-phase reference clock signals CLKra, CLKrb, CLKrax, CLKrbx and adding them. The first phase interpolation circuit 101*a* can adjust the phases of the first clock signals CLKa and CLKax in a range of 0 degrees to 360 degrees. The high-order bit phase information MSBa is phase information for performing rough adjustment, and the low-order bit phase information LSBa is phase information for performing fine adjustment.

Figure 2B:
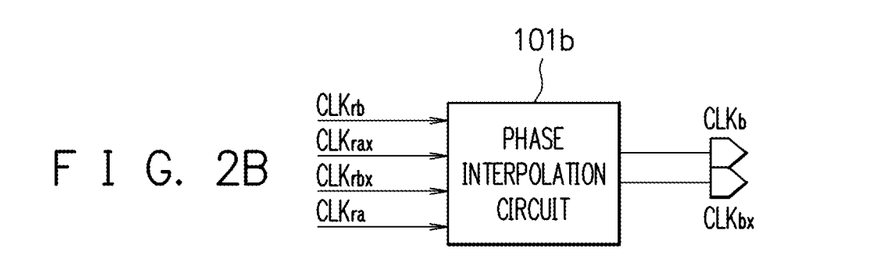

FIG. 2B is a diagram illustrating examples of input and output signals of the second phase interpolation circuit 101*b*. The second phase interpolation circuit 101*b* has the same configuration as that of the first phase interpolation circuit 101*a* in FIG. 3. However, the second phase interpolation circuit 101*b* receives input of reference clock signals CLKrb, CLKrax, CLKrbx, CLKra in place of the reference clock signals CLKra, CLKrb, CLKrax, CLKrbx of the first phase interpolation circuit 101*a*, and outputs second clock signals CLKb and CLKbx in place of the first clock signals CLKa and CLKax of the first phase interpolation circuit 101*a*. When a shift amount SD is "0," the second clock signals CLKb and CLKbx are signals delayed by 90 degrees with respect to the first clock signals CLKa and CLKax as illustrated in FIG. 5C.

Figure 5A:
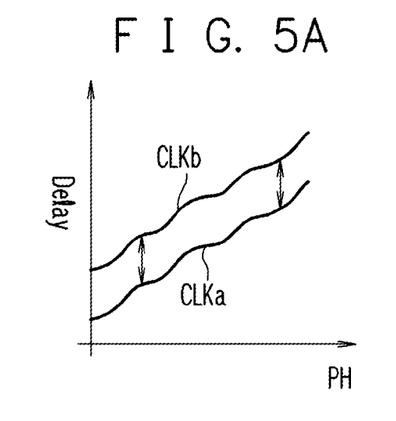
FIGS. 5A to 5E are charts illustrating non-linearity of a first clock signal and a second clock signal.
Figure 5B:
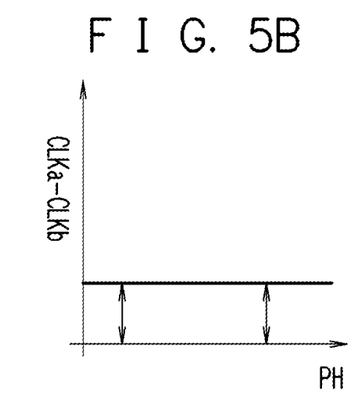
Figure 5C:
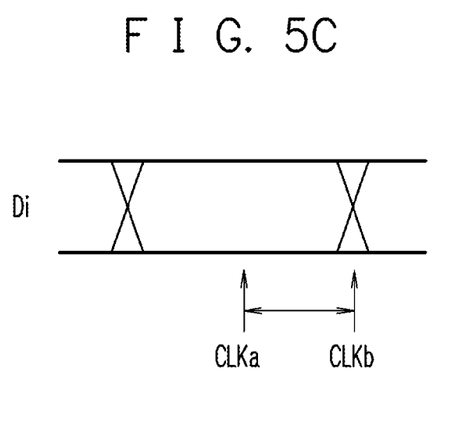

In FIG. 1, a first determinator 102*a* samples center data of the input data Di in synchronization with the edge of the first clock signal CLKa as illustrated in FIG. 5C, performs binary determination on the sampled center data, and outputs center data Do. Concretely, the first determinator 102a outputs the center data Do of "1" when the center data is larger than a threshold value, and outputs the center data Do of "0" when the center data is smaller than the threshold value. The phase of the edge of the first clock signal CLKa is adjusted by the first phase interpolation circuit 101a to the center phase of the input data Di.

A second determinator 102b samples transition point data of the input data Di in synchronization with the edge of the second clock signal CLKb as illustrated in FIG. 5C, performs binary determination on the sampled transition point data, and outputs transition point data Bd. Concretely, the second determinator 102b outputs the transition point data Bd of "1" when the transition point data is larger than a threshold value, and outputs the transition point data Bd of "0" when the transition point data is smaller than the threshold value. The phase of the edge of the second clock signal CLKb is adjusted by the second phase interpolation circuit 101b to the transition point phase of the input data Di.

A phase detection circuit 103 detects the phase on the basis of the center data Do and the transition point data Bd, and outputs an up signal UP and a down signal DN.

Figure 4A:
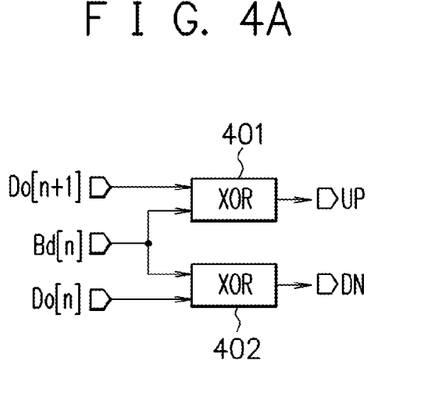
FIGS. 4A to 4D are diagrams illustrating a configuration example of a phase detection circuit in FIG. 1.
Figure 4B:
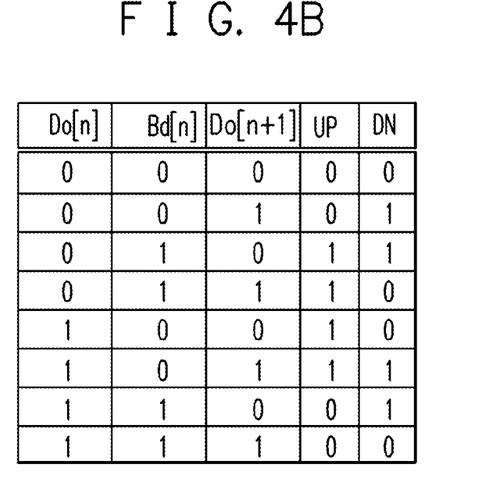

FIG. 4A is a diagram illustrating a configuration example of the phase detection circuit 103 in FIG. 1, and FIG. 4B is a chart illustrating a truth table of input and output of the phase detection circuit 103. Center data Do[n+1] is the center data Do of (n+1)th bit data. Transition point data Bd[n] is the transition point data Bd of nth bit data. Center data Do[n] is the center data Do of the nth bit data. An exclusive logical sum (XOR) circuit 401 outputs an exclusive logical sum of the center data Do[n+1] and the transition point data Bd[n] as the up signal UP. An exclusive logical sum (XOR) circuit 402 outputs an exclusive logical sum of the transition point data Bd[n] and the center data Do[n] as the down signal DN.

Figure 4C:
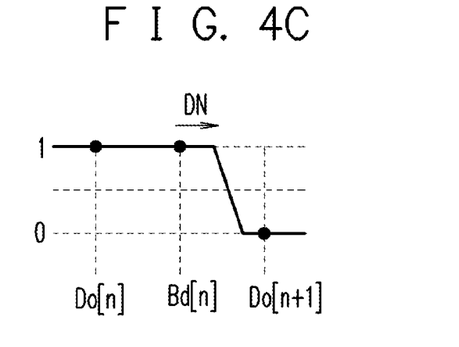

For example, in the case where the center data Do[n] is "1," the transition point data Bd[n] is "1" and the center data Do[n+1] is "0" as illustrated in FIG. 4C, the actual phase of the transition point is delayed from the phase of the transition point data Bd[n], and therefore the down signal DN of "1" and the up signal UP of "0" are outputted in order to delay the phases of the clock signals CLKa and CLKb.

Figure 4D:
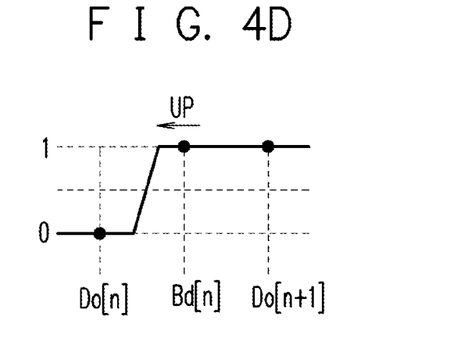

In the case where the center data Do[n] is "0," the transition point data Bd[n] is "1" and the center data Do[n+1] is "1" as illustrated in FIG. 4D, the actual phase of the transition point is advanced from the phase of the transition point data Bd[n], and therefore the up signal UP of "1" and the down signal DN of "0" are outputted in order to advance the phases of the clock signals CLKa and CLKb.

A filter 105 in FIG. 1 is a low-pass filter that performs low-pass filtering (integration) on the up signal UP and the down signals DN and thereby removes noise and outputs first phase information PH. An adder 106 adds the shift amount SD to the first phase information PH and thereby outputs the second phase information MSBa.

The first phase interpolation circuit 101a roughly adjusts the phase of the first clock signal CLKa on the basis of the second phase information MSBa. The second phase interpolation circuit 101b receives input of the first phase information PH as the high-order bit phase information MSBb and roughly adjusts the phase of the second clock signal CLKb on the basis of the high-order bit phase information MSBb. When the shift amount SD is 0, the phase information MSBa and the phase information MSBb are the same, and the phase difference between the first clock signal CLKa and the second clock signal CLKb is 90 degrees. In the case of FIG. 4C, the phases of the clock signals CLKa and CLKb are corrected in a delay direction by the phase interpolation circuits 101a and 101b. In the case of FIG. 4D, the phases of the clock signals CLKa and CLKb are corrected in an advance direction by the phase interpolation circuits 101a and 101b. This enables the first determinator 102a to sample the center data and the second determinator 102b to sample the transition point data.

Here, the phase difference between the first clock signal CLKa and the second clock signal CLKb sometimes shifts from 90 degrees due to the difference between the load or the wiring length of the first clock signal CLKa and the load or the wiring length of the second clock signal CLKb. In this case, to correct the phase difference between the first clock signal CLKa and the second clock signal CLKb to 90 degrees, the shift amount SD is inputted. Inputting the shift amount SD makes it possible to correct the phase difference between the first clock signal CLKa and the second clock signal CLKb to 90 degrees.

Ideally, the phase interpolation circuits 101a and 101b are circuits that interpolate between the four-phase reference clock signals ra, rb, rax, rbx at regular intervals. Actually, however, the first clock signal CLKa and the second clock signal CLKb have non-linearity to the phase information PH as illustrated in FIG. 5A. When the shift amount SD is 0, the phase interpolation circuits 101a and 101b have the same circuit configuration in FIG. 3 and have the same non-linearity. In this case, as illustrated in FIG. 5B, the phase difference between the first clock signal CLKa and the second clock signal CLKb can be kept at the same phase difference (90 degrees) to the phase information PH at all times. In this case, as illustrated in FIG. 5C, the phase difference between the first clock signal CLKa and the second clock signal CLKb is kept at 90 degrees, so that the edge of the first clock signal CLKa can keep the phase of the center data, and the edge of the second clock signal CLKb can keep the phase of the transition point data.

Figure 5D:
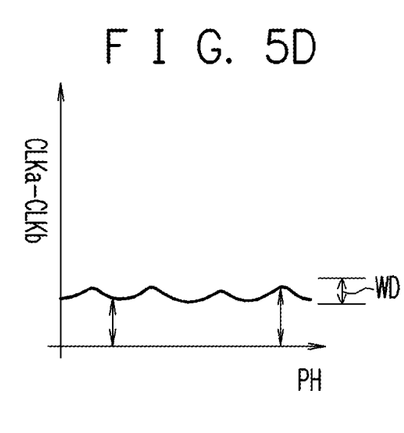
Figure 5E:
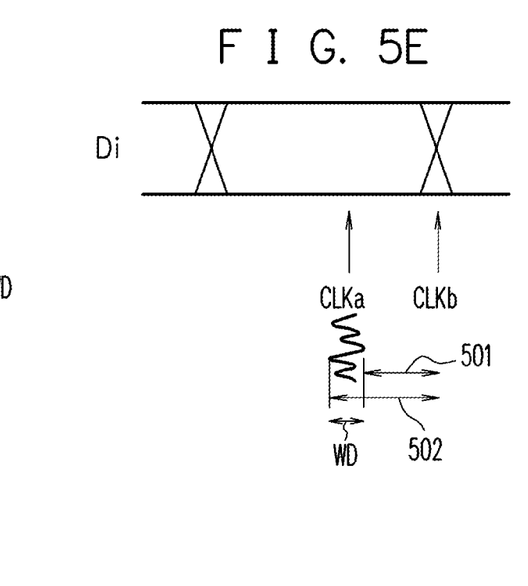

However, when the shift amount SD is not 0, the characteristics of the first clock signal CLKa in FIG. 5A move in a conceptually oblique direction. Therefore, the non-linearity of the first clock signal CLKa and the non-linearity of the second clock signal CLKb are different from each other. In this case, as illustrated in FIG. 5D, the phase difference between the first clock signal CLKa and the second clock signal CLKb is not kept at the same phase difference (90 degrees) to the phase information PH but has a vibration width WD. In this case, as illustrated in FIG. 5E, the phase of the first clock signal CLKa with respect to the second clock signal CLKb vibrates at the vibration width WD having a minimum phase 501 and a maximum phase 502. In this case, the edge of the first clock signal CLKa cannot keep the phase of the center data but increases in determination error rate (bit error rate) of the first determinator 102a.

Figure 6A:
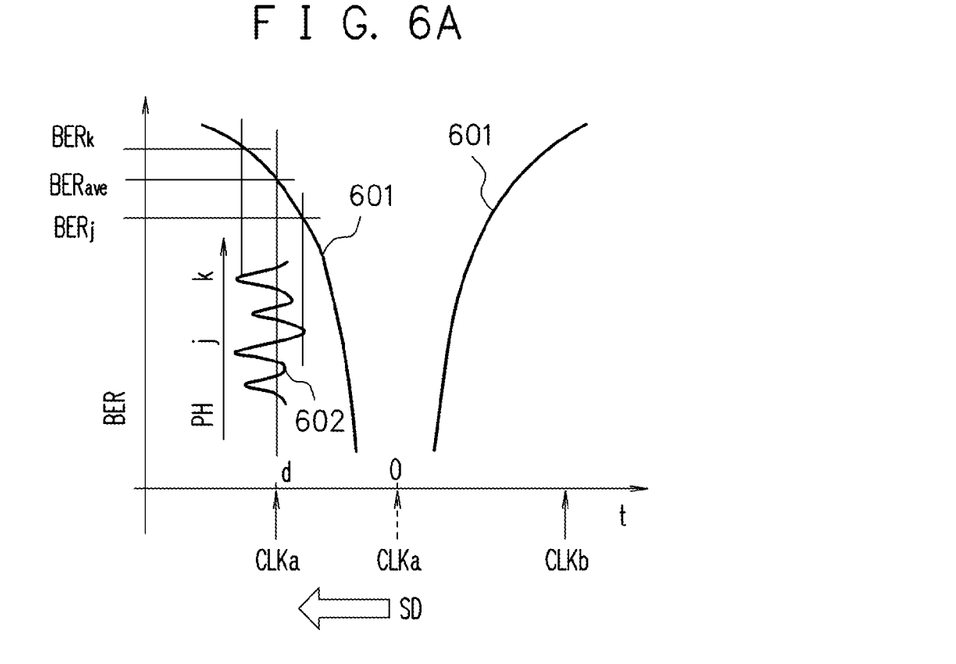
FIGS. 6A and 6B are charts illustrating a bit error rate with respect to a shift amount.
Figure 6B:
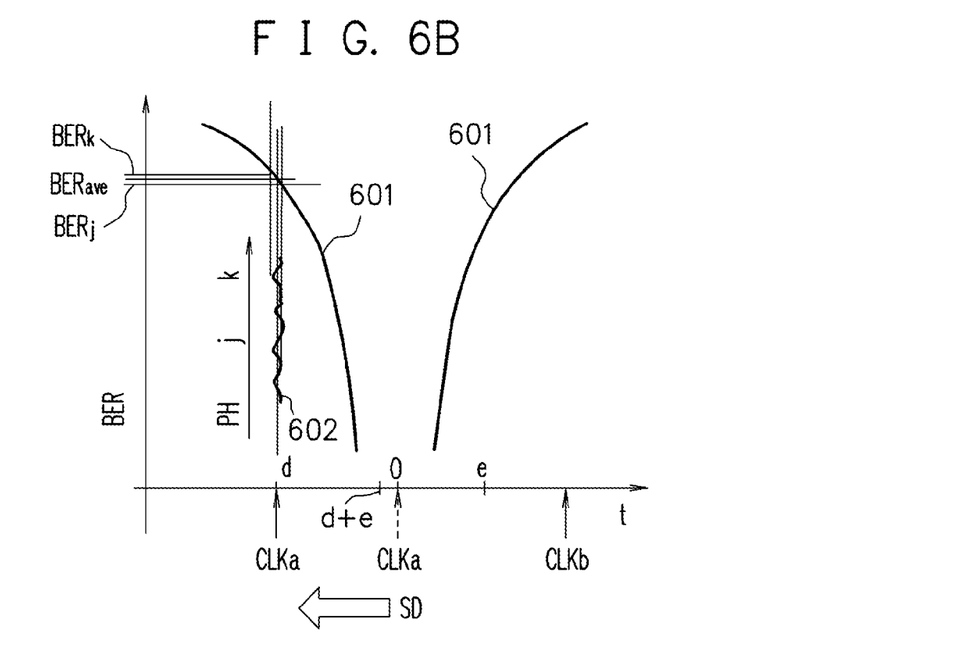

FIG. 6A is a chart illustrating a bit error rate (BER) 601 with respect to the shift amount SD. A first clock signal CLKa indicated with a broken line is a clock signal when the shift amount SD is 0 and located in the phase of the center data, and thus has an extremely low bit error rate. In contrast, a first clock signal CLKa indicated with a solid line is a clock signal when the shift amount SD is d (for example, −4) and shifted from the phase of the center data, and thus has a relatively high bit error rate. When SD=d, a phase 602 of the first clock signal CLKa with respect to the second clock signal CLKb vibrates with respect to the phase information PH as described above. When the phase 602 vibrates, the bit error rate 601 corresponding to the phase 602 also vibrates. For example, the bit error rate 601 becomes a minimum bit error rate BERj when the phase information PH is j, and becomes a maximum bit error rate BERk when the phase information PH is k.

An average bit error rate BERave is an average value of all bit error rates corresponding to the vibrating phase 602 and is a bit error rate corresponding to the average value of the vibrating phase 602. Since the bit error rate BERk is higher than the average bit error rate BERave, the absolute value of the phase (skew) of the first clock signal CLKa with respect to the second clock signal CLKb can be determined to be larger than the average value at the phase information PH=k. In this case, at the phase information PH=k, third phase information LSBa for delaying the phase of the first clock signal CLKa is generated so that the phase of the first clock signal CLKa becomes the average phase.

In contrast, since the bit error rate BERj is lower than the average bit error rate BERave, the absolute value of the phase (skew) of the first clock signal CLKa with respect to the second clock signal CLKb can be determined to be smaller than the average value at the phase information PH=j. In this case, at the phase information PH=j, third phase information LSBa for advancing the phase of the first clock signal CLKa is generated so that the phase of the first clock signal CLKa becomes the average phase.

The first phase interpolation circuit 101a finely adjusts the phase of the first clock signal CLKa on the basis of the third phase information LSBa. This makes it possible to decrease the vibration of the phase 602 of the first clock signal CLKa with respect to the second clock signal CLKb and keep the phase 602 almost constant at the shift amount SD=d. When the shift amount SD=d, it is possible to decrease the vibration of the phase 602 and make the phase difference between the first clock signal CLKa and the second clock signal CLKb almost constant.

Here, when the shift amount SD is near 0, the bit error rate is extremely low. As a result, the bit error rate of each piece of phase information PH is almost the same, so that it is difficult to generate the phase information LSBa by the above-described method. In this case, the following method is used.

A case of using the receiver circuit at the shift amount SD=d+e (for example, -1) will be described as an example. First, the phase information LSBa at the shift amount SD=d (for example, -4) is calculated by the above-described method. Next, the phase information LSBa at the shift amount SD=e (for example, +3) is similarly calculated. Then, on the basis of the phase information LSBa at the shift amount SD=d and the phase information LSBa at the shift amount SD=e, the phase information LSBa at the shift amount SD=d+e is calculated. By inputting d+e as the shift amount SD and inputting the phase information LSBa at the shift amount SD=d+e into the first phase interpolation circuit 101a, the phase difference between the first clock signal CLKa and the second clock signal CLKb is made almost constant, thereby decreasing the determination error rate of the first determinator 102a.

Figure 7:
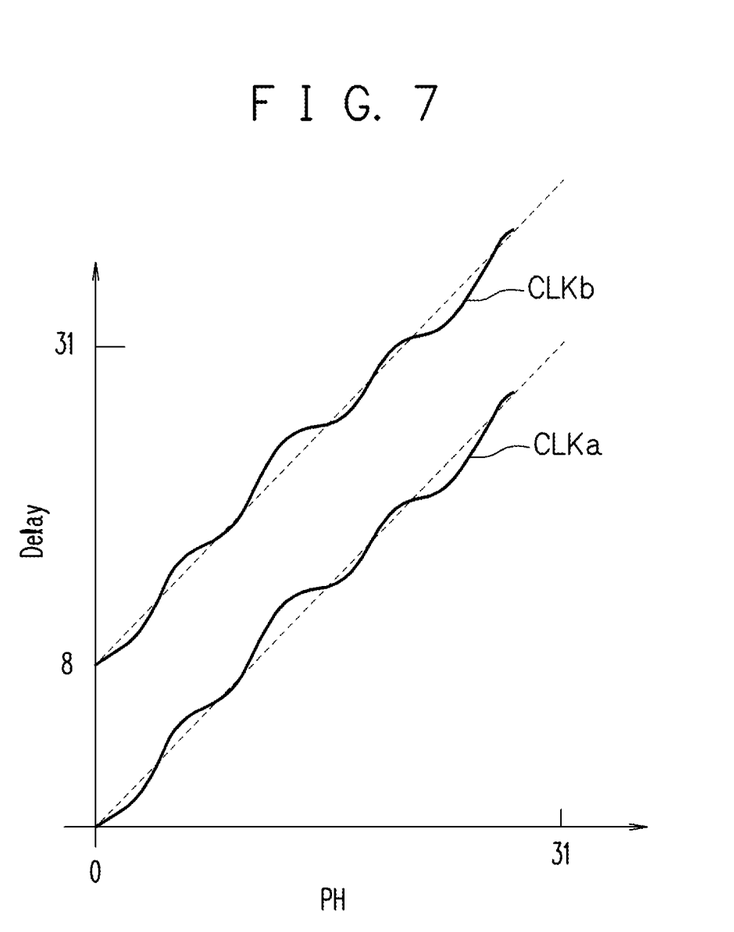
FIG. 7 is a chart illustrating the phases (delay times) of the first clock signal and the second clock signal with respect to phase information.

FIG. 7 is a chart illustrating the phases (delayed time) of the first clock signal CLKa and the second clock signal CLKb with respect to the phase information PH. The phase information PH periodically changes in a range, for example, 0 to 31. PH=32 is the same as PH=0, and the next to PH=31 is PH=0. Clock signals CLKa and CLKb indicated with broken lines are clock signals with ideal linear characteristics. Clock signals CLKa and CLKb indicated with solid lines are clock signals with actual non-linear characteristics. In this case, each piece of the high-order bit phase information MSBa and MSBb is 5 bits of 0 to 31, and, for example, each piece of the low-order bit phase information LSBa and LSBb is 2 bits.

Here, it is assumed that the phase of the first clock signal CLKa is Da and the phase of the second clock signal CLKb is Db. K is the phase in a range of 0 to 31. If k is a value outside the range, the remainder after division of k by 32 can be reread as k. It is assumed that the slope with respect to the phase information PH is 1 as illustrated in FIG. 7. The phase is 0 degrees when k=0, the phase is 360/32=11.25 degrees when k=1, ..., the phase is 348.75 degrees when k=31. The phase difference between the first clock signal CLKa and the second clock signal CLKb is almost k=8 (90 degrees). A non-linearity E(k) is a difference between the clock signal of the solid line and the clock signal of the broken line. The non-linearity E(k) is mainly decided by the circuit structures and the characteristics such as band and so on of the phase interpolation circuits 101a and 101b, and is therefore the common value in the phase interpolation circuits 101a and 101b when the shift amount SD=0.

Therefore, the following expressions are established.

$$Da(k)=k+E(k)$$

$$Db(k)=8+k+E(k)$$

In this case, Db(k)−Da(k) is 8 irrespective of the phase information PH, so that the phase difference between the first clock signal CLKa and the second clock signal CLKb can be said to still keep 90 degrees even with the non-linearity E(k).

Here, a case where the shift amount SD is applied will be described. SD=d and SD=e are outside the center phase of the input data Di, and the bit error rate is relatively large. Here, it is assumed that the phase Da(k) when SD=d is applied is Dad(k). The phase Dad(k) is expressed by the following expression.

$$Dad(k)=Da(k+d)=k+d+E(k+d)$$

Thus, the following expression is established.

$$Db(k)-Dad(k)=8-d+\{E(k)-E(k+d)\}$$

Thus, an error of {E(k)−E(k+d)} occurs according to the phase information PH(=k), so that the first clock signal CLKa vibrates with respect to the second clock signal CLKb. To correct the error due to the vibration, a correction amount Cd(k) corresponding to the phase information PH(=k) and the shift amount SD (=d) is calculated by the following expression.

$$Cd(k)=\{E(k)-E(k+d)\}$$

By rewriting the above expression, the following expression is established, so that the phase of the first clock signal CLKa with respect to the second clock signal CLKb after correction can keep a constant phase relation irrespective of the phase information PH(=k).

$$Db(k)=\{Dad(k)+Cd(k)\}=8-d$$

Next, as in the following expression, Cd(k) is shifted by −d and then applied to the phase Db(k), and SD=e is applied to Da(k). Here, it is assumed that the phase Da(k) when SD=e is applied is Dae(k).

$$Db(k)+Cd(k-d)=8+k+E(k)+\{E(k-d)-E(k)\}$$

$$Dae(k)=Da(k+e)=k+e+E(k+e)$$

The phase difference between the two clock signals is expressed by the following expression.

$$Db(k) + Cd(K-d) - Dae(k) =$$
$$8 + k + E(k) + \{E(k-d) - E(k)\} - \{k + e + E(k+e)\} =$$
$$8 - e + E(k-d) - E(k+e)$$

Next, by the following expression, a correction amount Cde(k) at SD=d+e is calculated.

$$Cde(k) = E(k-d) - E(k+e)$$

Next, as in the following expression, the correction amount Cde(k) is shifted by d and then applied to the phase Da(d+e). In this event, it is set that SD=d+e. Then, the correction amount applied to Db(k) is canceled.

$$Db(k) = 8 + k + E(k)$$
$$Da(d+e) + Cde(k+d) =$$
$$k + d + e + E(k+d+e) + E(k) - E(k+d+e) = k+d+e+E(k)$$

The difference between them is expressed by the following expression and has no relation with the phase information PH (=k).

$$Db(k) - \{Da(d+e) + Cde(k+d)\} = 8 - (d+e)$$

Accordingly, it can be said that the vibration of the first clock signal CLKa with respect to the second clock signal CLKb is eliminated with SD=d+e applied. If d and e are not found as the shift amount SD which enables measurement of the bit error rate, further division is performed and correction amounts are added by the same means using SD=d1+d2+d3 ... to thereby enable calculation of the correction amount for an arbitrary shift amount SD.

A pattern checker 104 in FIG. 1 detects an error signal ER of the center data Do being the determination value of the first determinator 102a. As initiation processing after power-on of the receiver circuit, the receiver circuit receives input of the input data Di of a test pattern. The test pattern is time-series known data based on a generating polynomial. The pattern checker 104 determines whether or not the center data Do with respect to the input data Di of the test pattern coincides with an expected value, and outputs the error signal ER of "0" when they coincide, and outputs an error signal ER of "1" when they do not coincide.

A corrector 107 has a bit error rate comparison circuit 108, adders 109a, 109b, and correction code registers REGa and REGb. The bit error rate comparison circuit 108 receives input of the error signal ER and the phase information PH and outputs correction amounts CUP and CDN.

Figure 8:
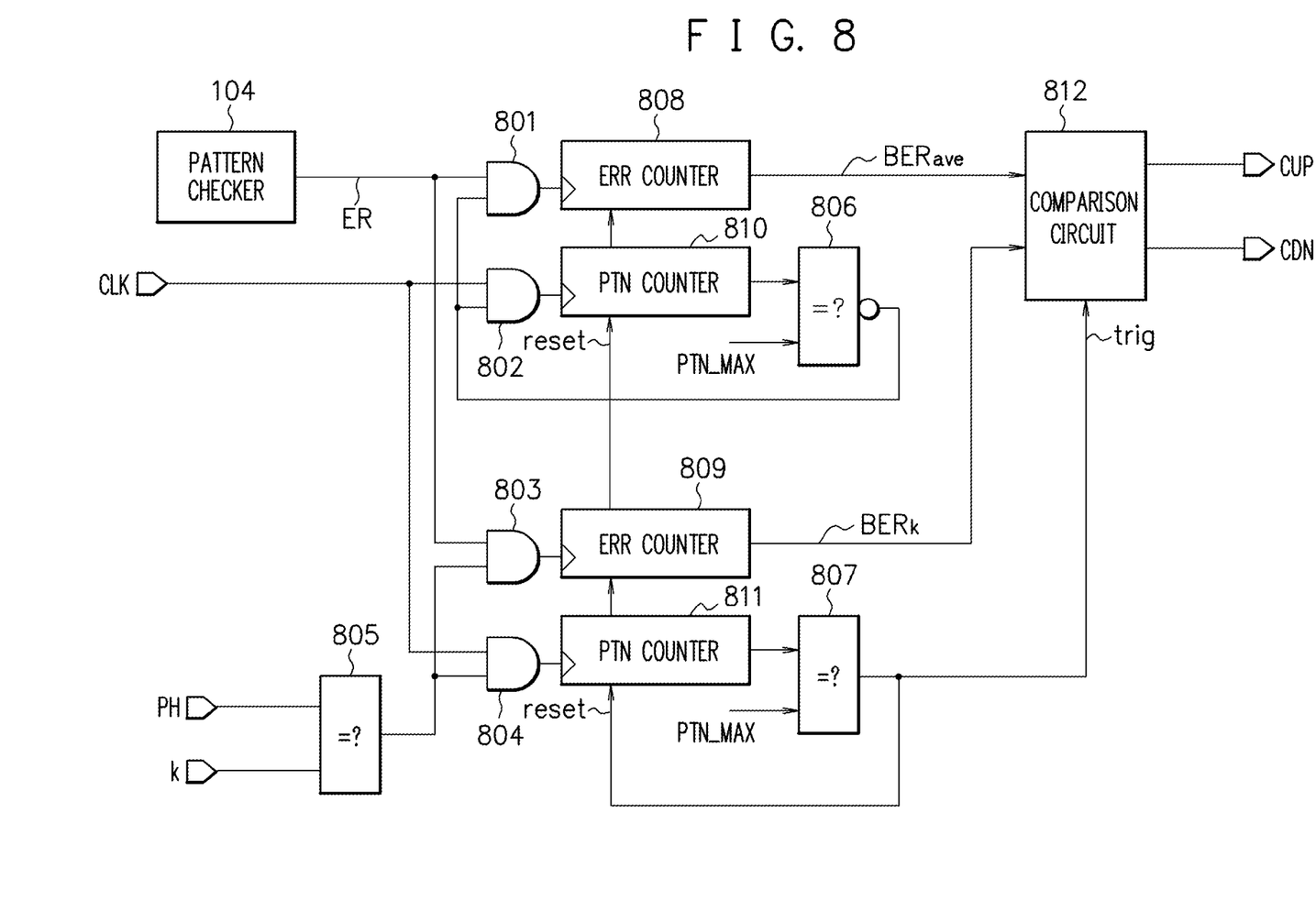
FIG. 8 is a diagram illustrating a configuration example of a bit error rate comparison circuit in FIG. 1.

FIG. 8 is a diagram illustrating a configuration example of the bit error rate comparison circuit 108 in FIG. 1. A logical product (AND) circuit 802 outputs a logical product signal of the clock signal CLK and the output signal of a comparison circuit 806. The clock signal CLK has a frequency corresponding to the bit rate of the input data Di. A pattern counter 810 counts the number of pulses of the output signal of the logical product circuit 802. The comparison circuit 806 outputs 0 when the count value of the pattern counter 810 and a pattern maximum value PTN_MAX coincide, and outputs 1 when they do not coincide. The pattern maximum value PTN_MAX is the number of patterns (the number of pieces of data) necessary for generating the phase information (correction amount) LSBa and is, for example, one million. More specifically, the comparison circuit 806 outputs 1 until the number of patterns of the input data Di of the test pattern reaches PTN_MAX and outputs 0 when it reaches PTN_MAX.

A logical product circuit 801 outputs a logical product signal of the error signal ER and the output signal of the comparison circuit 806. An error counter 808 counts the number of pulses of the output signal of the logical product circuit 801. More specifically, the error counter 808 outputs the number of patterns having an error signal ER of 1 in the total number of patterns PTN_MAX of the test pattern, as the average bit error rate BERave.

A comparison circuit 805 outputs 1 when the phase information PH and a variable k coincide, and outputs 0 when the phase information PH and a variable k do not coincide. The frequency corresponding to the bit rate of the input data Di is the same as the frequency of the clock signal of the transmitter circuit. In contrast, the clock signals CLKa and CLKb are clock signals of the receiver circuit. The clock signal of the transmitter circuit and the clock signal of the receiver circuit are asynchronous. Therefore, the frequency corresponding to the bit rate of the input data Di is slightly different from the frequencies of the clock signals CLKa and CLKb. Accordingly, the phase information PH changes circulating in the range of 0 to 31 with time. The variable k is sequentially changed in the range of 0 to 31. For instance, first, by setting k=0, a bit error rate BER0 is detected. Then, by setting k=1, a bit error rate BER1 is detected. Similarly, bit error rates BER2 to BER31 can be detected.

A logical product circuit 803 outputs a logical product signal of the error signal ER and the output signal of the comparison circuit 805. An error counter 809 counts the number of pulses of the output signal of the logical product circuit 803. More specifically, the comparison circuit 809 counts the number of patterns of an error signal ER=1 at PH=k and outputs a bit error rate BERk when PH=k.

A logical product circuit 804 outputs a logical product signal of the clock signal CLK and the output signal of the comparison circuit 805. A pattern counter 811 counts the number of pulses of the output signal of the logical product circuit 804. More specifically, the pattern counter 811 counts the number of patterns of PH=k. A comparison circuit 807 outputs 0 when the count value of the pattern counter 811 and the pattern maximum value PTN_MAX coincide, and outputs 1 when they do not coincide. More specifically, the comparison circuit 807 outputs 0 until the number of patterns of PH=k in the input data Di of the test pattern reaches PTN_MAX and outputs 1 when it reaches PTN_MAX.

A comparison circuit 812 receives input of the output signal of the comparison circuit 807 as a trigger signal trig, and compares the average bit error rate BERave and the bit error rate BERk when the trigger signal trig becomes 1. Then, when the bit error rate BERk is smaller than the average bit error rate BERave, the comparison circuit 812 outputs a phase correction amount CUP corresponding to BERave−BERk so as to increase the bit error rate BERk up to the average bit error rate BERave. Further, when the bit error rate BERk is larger than the average bit error rate BERave, the comparison circuit 812 outputs a phase correction amount CDN corresponding to BERk−BERave so as to decrease the bit error rate BERk down to the average bit error rate BERave. Note that the counters 808 to 811 are reset when the output value of the comparison circuit 807 becomes 1.

By sequentially changing the variable k from 0 to 31 as described above, the increment signal CUP and the decrement signal CDN with a correction amount at each phase of 0 to 31 are outputted.

In FIG. 1, the correction amount Cd in each phase of 0 to 31 inputted from the bit error rate comparison circuit 108 is held in the correction code register REGa, so that the correction amount Cd is updated by the increment signal CUP and the decrement signal CDN. The adder 109a adds the phase information PH and a phase SAa and outputs the resultant. The adder 109b adds the phase information PH and a phase SAb and outputs the resultant. The correction code register REGa outputs the correction amount corresponding to the phase outputted from the adder 109a, as the phase information LSBa to the first phase interpolation circuit 101a. The correction code register REGb outputs the correction amount corresponding to the phase outputted from the adder 109b, as the phase information LSBb to the second phase interpolation circuit 101b. Hereinafter, its details will be described.

Figure 9:
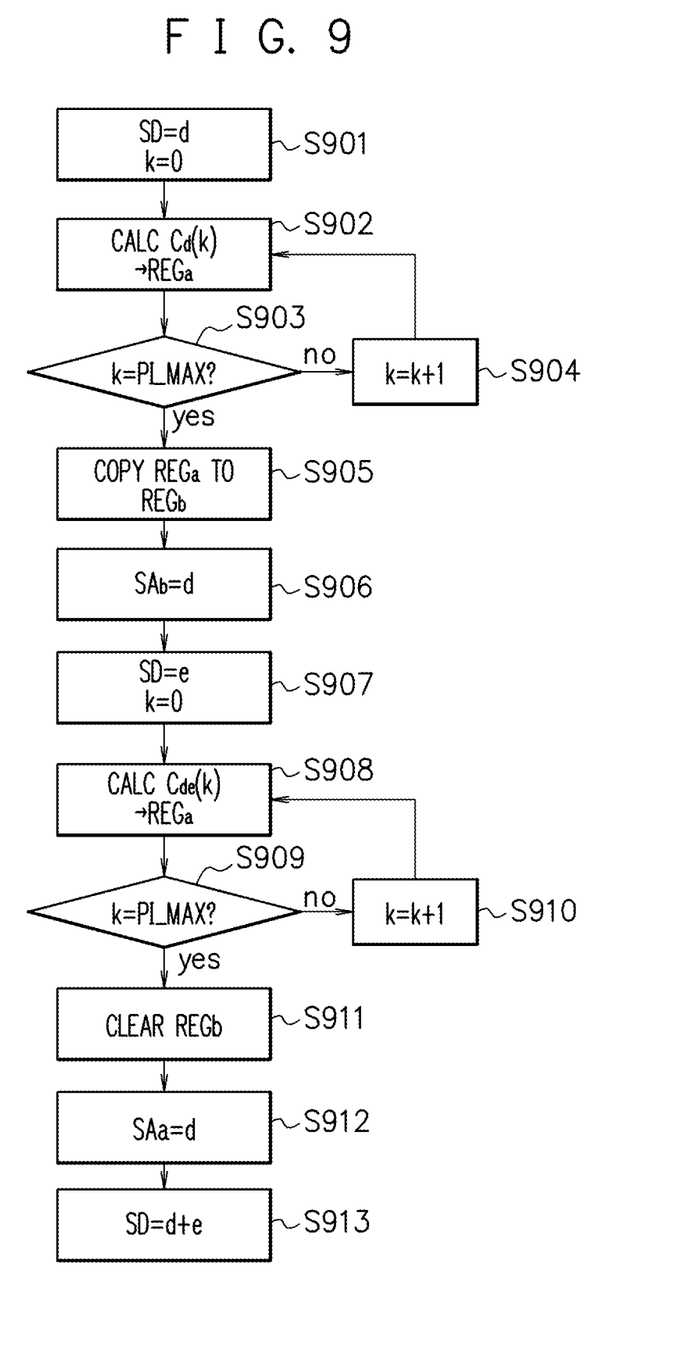
FIG. 9 is a flowchart illustrating a processing method of the receiver circuit in FIG. 1.
Figures 10A, 10B, 10C:
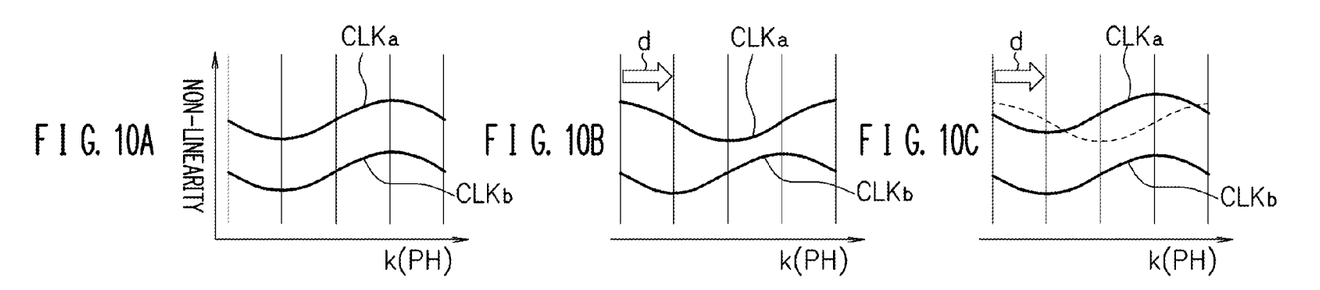
FIGS. 10A to 10H are charts illustrating a phase adjustment method of the first clock signal and the second clock signal.

FIG. 9 is a flowchart illustrating the processing method of the receiver circuit in FIG. 1, and FIGS. 10A to 10H are charts illustrating a phase adjustment method of the first clock signal CLKa and the second clock signal CLKb. First, in the initial state, SD=0, and the first clock signal CLKa and the second clock signal CLKb have the non-linearity E(k) with respect to the phase k of 0 to 31 as illustrated in FIG. 10A. The phase k indicates the phase of 0 to 31 as with the phase information PH. The non-linearity E(k) is the difference between the clock signal of the solid line and the clock signal of the broken line in FIG. 7.

First, at Step S901, the receiver circuit sets the shift amount SD=d and the variable k=0. The adder 106 outputs the phase made by adding the shift amount SD=d to the phase information PH as the phase information MSBa to the first phase interpolation circuit 101a. Then, the first clock signal CLKa in FIG. 10A is subjected to phase shift with the shift amount SD=d, whereby the first clock signal CLKa is adjusted in phase as illustrated in FIG. 10B.

Next, at Step S902, the receiver circuit calculates the correction amount Cd(k) by the following expression and writes the correction amount Cd(k) into the register REGa.

$$Cd(k)=\{E(k)-E(k+d)\}$$

Next, at Step S903, the receiver circuit determines whether or not the variable k is the same as a phase maximum value PI_MAX. The phase maximum value PI_MAX is, for example, 31. The processing proceeds to Step S905 if they are the same, and proceeds to Step S904 if they are not the same.

At Step S904, the receiver circuit increments the variable k and returns to Step S902 and repeats the above processing. Thus, each correction amount Cd(k) of k=0 to 31 is written into the register REGa. As a result, the first clock signal CLKa is adjusted in phase as illustrated in FIG. 10C.

At Step S905, the receiver circuit copies all correction amounts Cd(k) in the register REGa to the register REGb.

Figure 10D:
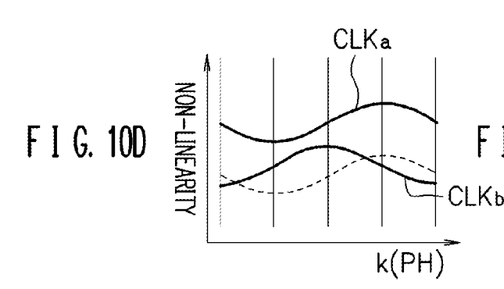

Next, at Step S906, the receiver circuit sets the phase SAb=d. The adder 109b adds the phase SAb=d to the phase information PH. Then, the second clock signal CLKb is adjusted in phase as illustrated in FIG. 10D.

Figures 10E, 10F:
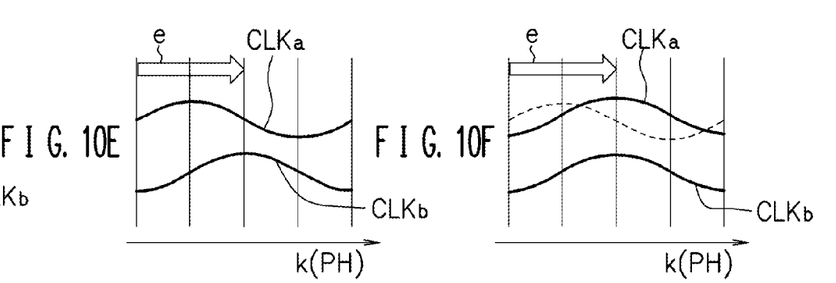

Next, at Step S907, the receiver circuit sets the shift amount SD=e and the variable k=0. The adder 106 outputs the phase made by adding the shift amount SD=e to the phase information PH as the phase information MSBa to the first phase interpolation circuit 101a. Then, the first clock signal CLKa in FIG. 10D is subjected to phase shift with the shift amount SD=e, whereby the first clock signal CLKa is adjusted in phase as illustrated in FIG. 10E.

Next, at Step S908, the receiver circuit calculates the correction amount Cde(k) by the following expression and writes the correction amount Cde(k) into the register REGa.

$$Cde(k)=E(k-d)-E(k+e)$$

Next, at Step S909, the receiver circuit determines whether or not the variable k is the same as the phase maximum value PI_MAX. The phase maximum value PI_MAX is, for example, 31. The processing proceeds to Step S911 if they are the same, and proceeds to Step S910 if they are not the same.

At Step S910, the receiver circuit increments the variable k and returns to Step S908 and repeats the above processing. Thus, each correction amount Cde(k) of k=0 to 31 is written into the register REGa. As a result, the first clock signal CLKa is adjusted in phase as illustrated in FIG. 10F.

At Step S911, the receiver circuit clears all phase correction amounts in the register REGb. Thus, the register REGb outputs the phase information LSBb of "0" at all times irrespective of the output value of the adder 109b.

Figures 10G, 10H:
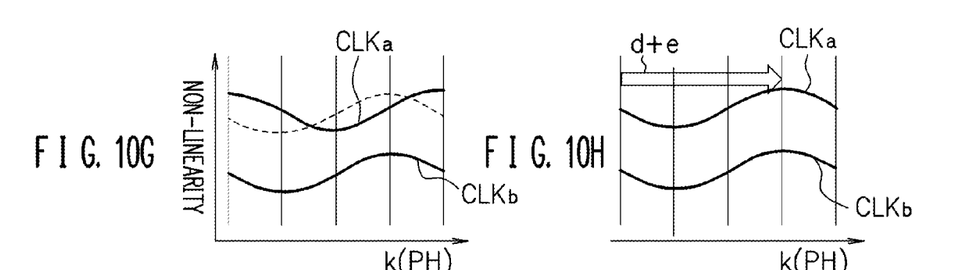

Next, at Step S912, the receiver circuit sets the phase SAa=d. The adder 109a adds the phase SAa=d to the phase information PH. Then, the first clock signal CLKa is adjusted in phase as illustrated in FIG. 10G, and the second clock signal CLKb returns to the state in FIG. 10A by clearing the register REGb.

Next, at Step S913, the receiver circuit sets the shift amount SD=d+e. The adder 106 outputs the phase made by adding the shift amount SD=d+e to the phase information PH as the phase information MSBa to the first phase interpolation circuit 101a. Then, the first clock signal CLKa is adjusted in phase as illustrated in FIG. 10H.

This generates the first clock signal CLKa and the second clock signal CLKb at the shift amount SD=d+e. The register REGa outputs the correction amount Cde(k) according to the output value of the adder 109a as the phase information LSBa. The register REGb outputs the phase information LSBb of "0" at all times. Since the first clock signal CLKa is corrected by the correction amount Cde(k) in the register ERGa, the phase difference between the first clock signal CLKa and the second clock signal CLKb becomes almost constant irrespective of the phase information PH. Since the vibration of the first clock signal CLKa with respect to the second clock signal CLKb is decreased, the first determinator 102a can sample the center of the input data Di to decrease the determination error rate.

Figure 11:
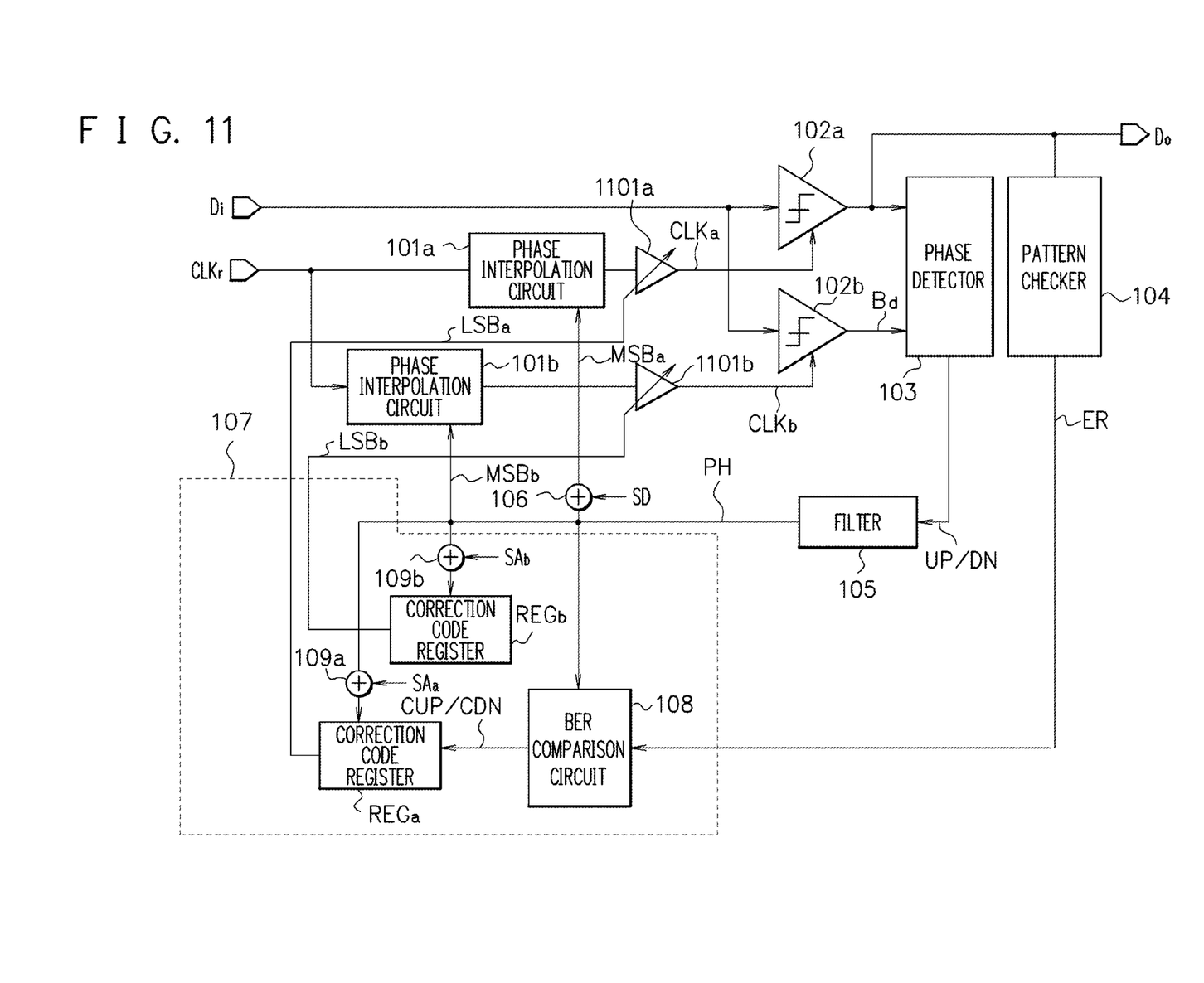
FIG. 11 is a diagram illustrating a configuration example of a receiver circuit according to another embodiment.

FIG. 11 is a diagram illustrating a configuration example of a receiver circuit according to another embodiment. The receiver circuit in FIG. 11 is made by adding a first delay circuit 1101a and a second delay circuit 1101b to the receiver circuit in FIG. 1. Hereinafter, the points of the receiver circuit in FIG. 11 different from the receiver circuit in FIG. 1 will be described.

A first phase interpolation circuit 101a adjusts the phase of a first clock signal CLKa only using phase information MSBa. A second phase interpolation circuit 101b adjusts the phase of a second clock signal CLKb only using phase information MSBb. The first delay circuit 1101a delays the output signal of the first phase interpolation circuit 101a according to the phase information LSBa to thereby adjust the phase of the first clock signal CLKa, and outputs the first clock signal CLKa to a first determinator 102a. The second delay circuit 1101b delays the output signal of the second phase interpolation circuit 101b according to the phase information LSBb to thereby adjust the phase of the second clock signal CLKb, and outputs the second clock signal CLKb to a second determinator 102b. In this case, the first phase interpolation circuit 101a and the first delay circuit 1101a constitute a first phase adjuster, and the second phase interpolation circuit 101b and the second delay circuit 1101b constitute a second phase adjuster.

A corrector 107 generates phase information LSBa for decreasing the variation in phase difference of the first clock signal CLKa with respect to the second clock signal CLKb. The first phase adjuster adjusts the phase of the first clock signal CLKa on the basis of the phase information MSBa and the phase information LSBa. The second phase adjuster adjusts the phase of the second clock signal CLKb on the basis of the phase information PH. Provision of the corrector 107 makes it possible to decrease the variation in phase difference between the first clock signal CLKa and the second clock signal CLKb and thereby decrease the occurrence rate of data error.

In the case of FIG. 1, the first phase adjuster has the first phase interpolation circuit 101*a* that generates the first clock signal CLKa by performing phase interpolation on the plurality of reference clock signals CLKra, CLKrb, CLKrax, CLKrbx on the basis of the phase information MSBb and the phase information LSBb. The second phase adjuster has the second phase interpolation circuit 101*b* that generates the second clock signal CLKb by performing phase interpolation on the plurality of reference clock signals CLKrb, CLKrax, CLKrbx, CLKra, on the basis of the phase information PH (=MSBb). Note that after the register REGb is cleared, the phase information LSBb becomes 0.

In the case of FIG. 11, the first phase adjuster has the first phase interpolation circuit 101*a* that generates the clock signal by performing phase interpolation on the plurality of reference clock signals CLKra, CLKrb, CLKrax, CLKrbx on the basis of the phase information MSBa, and the first delay circuit 1101*a* that generates the first clock signal CLKa by delaying the clock signal generated by the first phase interpolation circuit 101*a* on the basis of the phase information LSBa. The second phase adjuster has the second phase interpolation circuit 101*b* that generates the second clock signal CLKb by performing phase interpolation on the plurality of reference clock signals CLKrb, CLKrax, CLKrbx, CLKra on the basis of the phase information PH (=MSBb). Note that after the register REGb is cleared, the phase information LSBb=0, so that the second delay circuit 1101*b* does not perform delay but the second phase interpolation circuit 101*b* generates the second clock signal CLKb.

The corrector 107 generates the phase information LSBa for decreasing the variation in bit error rate BERk for each phase of the determination value of the first determinator 102*a*. Concretely, the corrector 107 generates the phase information LSBa on the basis of the bit error rate BERk for each phase of the determination value of the first determinator 102*a* and the average value BERave of the bit error rate for each phase. The corrector 107 further generates the phase information LSBa on the basis of the bit error rate BERk when the adder 106 adds a first shift amount d and the bit error rate BERk when the adder 106 adds a second shift amount e.

As described above, the phase difference of the first clock signal CLKa with respect to the second clock signal CLKb has a correlation with the bit error rate BERk corresponding thereto. Accordingly, the corrector 107 calculates the average value of the phase difference of the first clock signal CLKa with respect to the second clock signal CLKb and generates the phase information LSBa on the basis of the phase difference of the first clock signal CLKa with respect to the second clock signal CLKb and the average value.

Note that the above-described embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

Provision of a corrector makes it possible to decrease the variation in phase difference between a first clock signal and a second clock signal and thereby decrease the occurrence rate of data error.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A receiver circuit comprising:
a first phase adjuster configured to generate a first clock signal;
a second phase adjuster configured to generate a second clock signal;
a first determinator configured to perform binary determination on input data in synchronization with the first clock signal;
a second determinator configured to perform binary determination on the input data in synchronization with the second clock signal;
a phase detector configured to detect a phase on the basis of determination values of the first determinator and the second determinator;
a filter configured to filter on the phase detected by the phase detector and thereby output first phase information;
an adder configured to add a shift amount to the first phase information and thereby output second phase information; and
a corrector configured to generate third phase information for decreasing variation in phase difference of the first clock signal with respect to the second clock signal,
wherein the first phase adjuster adjusts a phase of the first clock signal on the basis of the second phase information and the third phase information, and
wherein the second phase adjuster adjusts a phase of the second clock signal on the basis of the first phase information.

2. The receiver circuit according to claim 1,
wherein the corrector calculates an average value of the phase difference of the first clock signal with respect to the second clock signal, and generates the third phase information on the basis of the phase difference of the first clock signal with respect to the second clock signal and the average value.

3. The receiver circuit according to claim 1,
wherein the corrector generates the third phase information for decreasing variation in bit error rate for each phase of the determination value of the first determinator.

4. The receiver circuit according to claim 1,
wherein the corrector generates the third phase information on the basis of a bit error rate for each phase of the determination value of the first determinator and an average value of the bit error rate for each phase.

5. The receiver circuit according to claim 4,
wherein the corrector generates the third phase information on the basis of the bit error rate when the adder adds a first shift amount and the bit error rate when the adder adds a second shift amount.

6. The receiver circuit according to claim 1,
wherein the first phase adjuster has a first phase interpolation circuit that generates the first clock signal by performing phase interpolation on a plurality of reference clock signals on the basis of the second phase information and the third phase information, and
wherein the second phase adjuster has a second phase interpolation circuit that generates the second clock signal by performing phase interpolation on a plurality of reference clock signals on the basis of the first phase information.

7. The receiver circuit according to claim 1,
wherein the first phase adjuster has a first phase interpolation circuit that generates a clock signal by performing phase interpolation on a plurality of reference clock signals on the basis of the second phase information and a first delay circuit that generates the first clock signal by delaying the clock signal generated by the first phase interpolation circuit on the basis of the third phase information, and
wherein the second phase adjuster has a second phase interpolation circuit that generates a clock signal by performing phase interpolation on a plurality of reference clock signals on the basis of the first phase information and a second delay circuit that generates the second clock signal by delaying the clock signal generated by the second phase interpolation circuit.

* * * * *